Patented Aug. 16, 1949

2,479,211

UNITED STATES PATENT OFFICE 2,479,211

SYNTHESIS OF CARBAZOLE FROM O-AMINOBIPHENYL WITH ALUMINA AS TAR INHIBITOR

Courtney Conover, St. Louis, Mo., assignor to Monsanto Chemical Company, St. Louis, Mo., a corporation of Delaware No Drawing. Application November 9, 1946, Serial No. 708,938

6 Claims. (Cl. 260—315)

This invention relates to the manufacture of carbazole and especially to processes for manufacturing carbazole from o-aminobiphenyl.

The synthesis of carbazole from o-aminobiphenyl by heating the substance in the vapor phase with oxygen in the presence of a catalyst such as an oxide of vanadium or molybdenum was reported by Morgan and Walls (J. Soc. Chem. Ind. 57, 358, 1938). The vapor phase reaction produces good conversion at 600° C. However, at temperatures as low as 450–550° C. the conversion is almost negligible. The high temperatures necessary for this conversion, the limitations of apparatus and handling inherent in the use of catalysts in conjunction with high temperature vapor phase operations, the hazard from fires and explosions in vapor phase operations, and other problems make new methods of manufacture of carbazole from o-aminobiphenyl desirable.

Efforts have been made to obtain carbazole by fusing o-aminobiphenyl with a nitro compound of the benzene series at temperatures in the range of 340–350° C. This process results in the formation of large portions of a complex tarry residue and a crude carbazole product grossly contaminated and difficult to purify. Moreover, since the nitro compound employed as an oxidation agent in this process is apparently converted to a complex tarry mixture from which no usable product can be recovered, the cost of this material can only be charged as part of the cost of raw material, thereby greatly increasing the cost of the finished product.

One of the objects of the present invention is to provide an improved process for making carbazole by the air-oxidation of o-aminobiphenyl in the liquid phase.

Another object is to provide an improved method of oxidizing o-aminobiphenyl in the liquid phase with a minimum formation of tar. Other objects will become apparent from the following description and examples.

According to the present invention, generally stated, o-aminobiphenyl is oxidized to carbazole in good yields by intimately contacting o-aminobiphenyl in the liquid phase with air, for example, by agitating o-aminobiphenyl in the molten state in the presence of a stream of air or other oxygen-containing gas at a temperature in the range of 300–400° C. As a further embodiment of my invention, the process is desirably conducted in the presence of an inhibitor of tar formation. I have found that either crystalline alumina hydrate or graphite are excellent inhibitors of tar formation in the process of the present invention and are far more effective than any other substances tested for this purpose.

In the process of the present invention, air may be supplied to the reaction zone under pressure, for example, at a pressure in the range of 10–75 lbs. per sq. in., and desirably in the range of 45–55 lbs. per sq. in. and thereafter vented from the reaction zone. The air stream may be passed through the reaction mixture, although this is not essential when the reaction mixture is vigorously agitated. On the other hand, it may be desirable to employ the air stream as a means for effecting at least part of the agitation, for example, by passing the stream through the reaction mixture. The volume of air brought into contact with the reaction mixture by any desired means during the course of the reaction should be in excess of theory for the oxidation of o-aminobiphenyl to carbazole and desirably approximately 4 to 6 times the theoretical requirement. A suitable rate of flow of air for this purpose may be in the range of 2 to 22 cu. ft. per 100 lbs. of o-aminobiphenyl per minute. This rate of flow may be varied according to the particular conditions employed in each instance.

The tar inhibitor, for example, the crystalline alumina hydrate and graphite, are desirably employed in amounts of 0.8 parts by weight or more per 100 parts by weight of o-aminobiphenyl although smaller or larger amounts may be employed, for example, with variations in the temperature, pressure, and agitation. I have found that increasing the reaction temperature above 280° C. results in the formation of less tar, although this is accomplished at the expense of lower conversions of o-aminobiphenyl to carbazole. I have also found that the presence of crystalline alumina hydrate or graphite in amounts hereinbefore set forth results in very marked inhibition of the tar formation, and particularly in the temperature range of 330–375° C.

Other substances which may be employed as tar inhibitors in the process of the present invention are metal salts such as the nitrates, chromates, benzoates, succinates, and monobutyl-butyloxy-succinates, of metals such as manganese, cobalt, aluminum, copper, iron, lead, and sodium, and oxides such as titanium oxides. However, none of these substances are in the same category as crystalline alumina hydrate and graphite with regard to effectiveness in inhibiting tar formation in the process.

The carbazole formed by the process of the present invention may be recovered by any desired procedure, for example, the reaction mixture may be dissolved in hot o-xylene and the solution may be filtered while hot. The carbazole crystallizes from the filtrate and is then filtered off, washed with o-xylene and dried. Other suitable solvents such as hot o-dichlorobenzene may be employed in place of o-xylene for the crystallization operation.

The following examples will serve to illustrate the novel process of the present invention. These examples are merely illustrative and are not to be construed as limiting the invention as defined in the appended claims.

Example I

A mixture of 250 grams of o-aminobiphenyl and 4 grams of finely divided crystalline alumina hydrate is heated to a temperature of 375° C. in a jacketed, heated autoclave. The liquid reaction mixture is strongly agitated, for example, by means of a rotary agitator at 960 R. P. M. A stream of air at a pressure of 50 lbs. per sq. in. is admitted to the autoclave at the rate of 2 cu. ft. per minute. The pressure in the autoclave is maintained at approximately 50 lbs. per sq. in. and the reaction mixture is maintained at 375° C. for 6 hours. Thereafter, the pressure is released and the reaction mixture is dissolved in hot o-xylene, filtered while hot and allowed to cool. The crystalline carbazole which separates is filtered off, washed with cold o-xylene and dried. A 26.5% conversion of o-aminobiphenyl to carbazole is thus obtained representing a yield based on o-aminobiphenyl consumed of 97.5%.

Example II

The process of Example I was repeated using 4 grams of fine flake graphite in place of the crystalline alumina hydrate. A 28.2% conversion of o-aminobiphenyl was obtained representing a yield based on o-aminobiphenyl consumed of 93.4%.

Example III

The process of Example I was repeated omitting the crystalline alumina hydrate tar inhibitor and operating the process at 360° C. and 52 lbs. per sq. in. for 8 hours. A 34.5% conversion of o-aminobiphenyl to carbazole was obtained representing a yield of carbazole on o-aminobiphenyl consumed of 87.2%.

Example IV

A series of runs were made according to the process described in Example I in which 4 grams of crystalline alumina hydrate per 250 grams of o-aminobiphenyl were employed as tar inhibitors and the time of reaction was 8 hours. The rate of agitation was 960 R. P. M., the pressure in the autoclave was maintained at 45–50 lbs. per sq. in. by controlling the pressure of the air flow into the autoclave and the temperature of the reaction mixture in respective runs was varied from 280° C. to 375° C. The results are tabulated in Table I.

Table I

| Temp. of Reaction Mixture, °C. | Percent Conversion of o-aminobiphenyl | | Yield on o-aminobiphenyl Consumed (Percent of Theory) |
|---|---|---|---|
| | To Tar | To Carbazole | |
| 280 | 17.9 | 25.6 | 56.4 |
| 305 | 15.0 | 45.9 | 75.4 |
| 330 | 8.8 | 39.3 | 81.9 |
| 345 | 7.4 | 42.0 | 85.1 |
| 355 | 3.7 | 33.4 | 90.0 |
| 365 | 0.7 | 13.6 | 95.2 |
| 365 | 1.3 | 29.2 | 95.6 |
| 375 | 0.1 | 9.6 | 99.0 |

It will be observed from Table I that the minimum tar formation was obtained under the conditions of the reaction when the temperature of the reaction mixture was 375° C. The residual o-aminobiphenyl may be recovered in plant practice from the reaction mixture by distillation after removal of carbazole therefrom and may be employed as part of the charge of succeeding runs.

Example V

A series of runs were made according to the procedure of Example I in which the amount of crystalline alumina hydrate tar inhibitor was varied from 2–8 parts by weight per 250 parts by weight of o-aminobiphenyl. The time of reaction was 6 hours, the average pressure was 55 lbs. per sq. in., the rate of agitation was 960 R. P. M., and the temperature of the reaction mixture was maintained in each instance in the range of 370–2° C. The results are tabulated in Table II.

Table II

| Amount of Inhibitor | Temp. of Reaction Mixture, °C. | Percent Conversion of o-aminobiphenyl | | Yield on o-aminobiphenyl Consumed, Percent of Theory |
|---|---|---|---|---|
| | | To Tar | To Carbazole | |
| None | 370 | 8.0 | 22.9 | 85.2 |
| 2.0 | 371 | 1.7 | 23.9 | 93.5 |
| 4.0 | 370 | 1.3 | 23.8 | 94.8 |
| 8.0 | 372 | 1.4 | 22.8 | 94.4 |

Example VI

A series of runs were made according to the procedure of Example I in which the rate of agitation was 480 R. P. M., the time of reaction was 24 hours, the temperature of the reaction mixture was maintained at 305–310° C., and the pressure in the autoclave was maintained at 49–52 lbs. per sq. in. In successive runs, respective tar inhibitors selected from a group consisting of inorganic and organic salts of certain metals were employed in amounts of 0.0335 gram-atoms of metal per mole of o-aminobiphenyl. The metal salts thus employed were zinc stearate, manganese benzoate, cobalt benzoate, mixtures of aluminum nitrate, copper nitrate, cobalt nitrate and ferric nitrate, titanium oxide. Ammonium chromate was also employed. In each instance large portions of tar were formed and the yields of carbazole based on o-aminobiphenyl consumed ranged from 29% to less than 60%.

Example VII

A series of runs were made according to the method of Example I in which the pressure in the autoclave was varied. The temperature of the reaction mixture was maintained at 375° C. and the rate of agitation was maintained at 960 R. P. M. The tar inhibitor employed was 4 grams of crystalline alumina hydrate, per 250 grams of o-aminobiphenyl. The pressure in the autoclave was varied in successive runs from 10 lbs. per sq. in. to 75 lbs. per sq. in. In each run carbazole was found to have been produced in substantial yields. The range of 30–60 lbs. per sq. in. was found to give very satisfactory results in terms of yield and quality of product.

The process of the present invention as illustrated in the aforescribed examples is desirably operated at a reaction temperature in the range of 330–375° C. with strong agitation and with an excess of air over the theoretical requirement in order to obtain a maximum conversion of o-aminobiphenyl to carbazole with a minimum of tar formation and a maximum yield of carbazole based on o-aminobiphenyl consumed. Moreover, for maximum inhibition of tar formation, the process is desirably operated in the presence of finely divided crystalline alumina hydrate or of graphite to the extent of approximately 4 parts by weight of inhibitor to 250 parts by weight of o-aminobiphenyl, or at least 1.6 parts by weight per 100 parts of o-aminobiphenyl. Variations in the conditions under which the process is operated, depending upon the nature and size of the equipment and the other factors involved, are contemplated as being within the scope of the present invention and the invention is not to be construed as being limited to the specific conditions, agents, or apparatus described in the examples except as defined in the appended claims.

I claim:

1. A process of making carbazole comprising intimately contacting o-aminobiphenyl in the liquid phase with an excess of an oxygen-containing gas under pressure in the presence of crystalline alumina hydrate at a temperature in the range of 300–400° C., for a period of time in the range of 6–24 hours and subsequently recovering carbazole from the reaction mixture.

2. A process of making carbazole comprising intimately contacting o-aminobiphenyl in the liquid phase with an excess of air under pressure in the presence of 2–8 parts by weight of crystalline alumina hydrate per 250 parts by weight of o-aminobiphenyl at a temperature in the range of 300–375° C. for a period of time in the range of 6–24 hours, and subsequently recovering carbazole from the reaction mixture.

3. A process of making carbazole comprising intimately contacting o-aminobiphenyl in the liquid phase with an excess of air under pressure in the presence of at least 0.8 part by weight of crystalline alumina hydrate per 100 parts by weight of o-aminobiphenyl at a temperature in the range of 330–375° C. for a period of time in the range of 6–24 hours, passing said air into the reaction mixture at a rate in the range of 2–22 cu. ft. per 100 lbs. of o-aminobiphenyl per minute, and subsequently recovering carbazole from the reaction mixture.

4. A process of making carbazole comprising intimately contacting o-aminobiphenyl in the liquid phase with an excess of air under pressure in the presence of crystalline alumina hydrate at a temperature in the range of 330–375° C. for a period of time in the range of 6–24 hours, passing said air through said reaction mixture at a rate in the range of 2–22 cu. ft. per 100 lbs. of o-aminobiphenyl per minute, and subsequently recovering carbazole from the reaction mixture.

5. In the manufacture of carbazole by the air-oxidation of o-aminobiphenyl in the liquid phase, the step comprising intimately contacting o-aminobiphenyl in the presence of crystalline alumina hydrate and in the presence of air at a pressure in the range of 10–75 lbs. per sq. in. and a reaction temperature in the range of 300–375° C. for a period of time in the range of 6–24 hours.

6. In the manufacture of carbazole by the air-oxidation of o-aminobiphenyl in the liquid phase, the step comprising intimately contacting o-aminobiphenyl in the presence of at least 0.8 part by weight of crystalline alumina hydrate per 100 parts by weight of o-aminobiphenyl and in the presence of air at a pressure in the range of 30–60 lbs. per sq. in. and a reaction temperature in the range of 300–375° C. for a period of time in the range of 6–24 hours.

COURTNEY CONOVER.

REFERENCES CITED

The following references are of record in the file of this patent:

UNITED STATES PATENTS

| Number | Name | Date |
| --- | --- | --- |
| 2,351,171 | Weinmayr | June 13, 1944 |

OTHER REFERENCES

Morgan et al., Jour. Soc. Chem. Ind., vol. 57, pages 358 to 360 (1938). (Copy in 260–315.)